United States Patent
Chichester et al.

(10) Patent No.: US 9,766,133 B2
(45) Date of Patent: Sep. 19, 2017

(54) THERMAL SENSING SYSTEM

(71) Applicant: Lummus Technology Inc., Bloomfield, NJ (US)

(72) Inventors: Steven Elmer Chichester, Terre Haute, IN (US); Michael James Hickey, Clinton, IN (US)

(73) Assignee: Lummus Technology Inc., Bloomfield, NJ (US)

( * ) Notice: Subject to any disclaimer, the term of this patent is extended or adjusted under 35 U.S.C. 154(b) by 647 days.

(21) Appl. No.: 14/079,065

(22) Filed: Nov. 13, 2013

(65) Prior Publication Data

US 2014/0154140 A1   Jun. 5, 2014

Related U.S. Application Data

(60) Provisional application No. 61/731,927, filed on Nov. 30, 2012.

(51) Int. Cl.
*G01K 1/08* (2006.01)
*G01K 1/12* (2006.01)
(Continued)

(52) U.S. Cl.
CPC ............... *G01K 1/14* (2013.01); *C10J 3/485* (2013.01); *C10J 3/721* (2013.01); *C10J 3/723* (2013.01);
(Continued)

(58) Field of Classification Search
CPC ............... G01K 1/08; G01K 1/12; G01K 1/14
See application file for complete search history.

(56) References Cited

U.S. PATENT DOCUMENTS 2,695,219 A * 11/1954 Upham ................ B01J 8/1809
  208/47
2,789,034 A *  4/1957 Sloan, Jr. ............. C01B 17/52
  159/DIG. 3
(Continued)

FOREIGN PATENT DOCUMENTS

CN   101772562 A     7/2010
DE     3526391 A *   7/1985
(Continued)

OTHER PUBLICATIONS

Patent Examination Report No. 1 issued Mar. 18, 2016 in corresponding Australian application No. 2013353340 (2 pages).

(Continued)

*Primary Examiner* — Gail Kaplan Verbitsky
(74) *Attorney, Agent, or Firm* — Osha Liang LLP

(57) ABSTRACT

A temperature measurement system for a gasifier may employ a first stage gasifier with a refractory wall that defines a first stage gasifier volume. A protruding refractory brick may protrude from the first stage refractory wall and into a gaseous flow path of the first stage gasifier volume. The temperature sensor may reside completely through the refractory wall, which may be a plurality of brick layers, except for a tip end of a temperature sensor that may reside in a blind or non-through hole within the protruding refractory brick. The protruding refractory brick protrudes beyond a normal wall surface of the plurality of brick layers that defines the first stage gasifier volume. The protruding refractory brick may have a face that forms an angle that is not 90 degrees, such as 45 degrees, relative to the gaseous flow path of the fluid stream through the first stage gasifier volume.

18 Claims, 6 Drawing Sheets

(51) Int. Cl.
*G01K 1/14* (2006.01)
*C10J 3/48* (2006.01)
*C10J 3/72* (2006.01)
*C10J 3/86* (2006.01)
*C10K 1/00* (2006.01)
*C10K 1/02* (2006.01)
*C10K 3/04* (2006.01)

(52) U.S. Cl.
CPC ............. *C10J 3/86* (2013.01); *C10K 1/003* (2013.01); *C10K 1/024* (2013.01); *C10J 2300/093* (2013.01); *C10J 2300/0906* (2013.01); *C10J 2300/0943* (2013.01); *C10J 2300/0959* (2013.01); *C10J 2300/0973* (2013.01); *C10J 2300/165* (2013.01); *C10J 2300/1612* (2013.01); *C10J 2300/1653* (2013.01); *C10J 2300/1675* (2013.01); *C10J 2300/1884* (2013.01); *C10K 3/04* (2013.01); *Y02E 20/18* (2013.01); *Y02E 20/185* (2013.01)

(56) References Cited

U.S. PATENT DOCUMENTS

| | | | | |
|---|---|---|---|---|
| 3,336,109 | A * | 8/1967 | Sanlaville | C01F 7/445 422/198 |
| 3,610,045 | A * | 10/1971 | Sherman | H01L 35/32 136/234 |
| 3,652,070 | A * | 3/1972 | Sagara | C21B 7/10 266/193 |
| 3,715,441 | A * | 2/1973 | Collins | G01K 7/04 136/233 |
| 4,358,953 | A * | 11/1982 | Horiuchi | C21B 7/06 374/137 |
| 4,412,090 | A | 10/1983 | Kawate et al. | |
| 4,489,562 | A * | 12/1984 | Snyder | C10J 3/08 48/197 R |
| 5,005,986 | A * | 4/1991 | Najjar | G01K 1/10 136/230 |
| 5,064,295 | A | 11/1991 | Thill et al. | |
| 5,147,137 | A * | 9/1992 | Thiesen | G01K 1/125 136/234 |
| 5,242,155 | A * | 9/1993 | Thomlinson | C22B 21/0084 266/242 |
| 5,277,879 | A * | 1/1994 | Elvin | B01J 8/1818 239/569 |
| 6,053,632 | A * | 4/2000 | Leininger | G01J 5/041 374/130 |
| 6,302,578 | B1 * | 10/2001 | Stevenson | G01K 1/10 374/141 |
| 6,375,346 | B1 * | 4/2002 | Lunsford | G01B 21/085 374/4 |
| 6,536,950 | B1 * | 3/2003 | Green | G01K 1/10 374/141 |
| 6,647,903 | B2 * | 11/2003 | Ellis | C10J 3/06 110/229 |
| 8,241,585 | B2 * | 8/2012 | Taber | F23M 5/02 110/323 |
| 8,444,724 | B2 | 5/2013 | Douglas et al. | |
| 9,243,197 | B2 * | 1/2016 | Hladun | C10J 3/00 |
| 2003/0174756 | A1 * | 9/2003 | Groen | G01K 1/14 374/141 |
| 2005/0109603 | A1 | 5/2005 | Graham | |
| 2006/0260192 | A1 | 11/2006 | Barot | |
| 2007/0187223 | A1 * | 8/2007 | Graham | C10J 3/20 201/25 |
| 2008/0041572 | A1 | 2/2008 | Wessel et al. | |
| 2008/0124253 | A1 * | 5/2008 | Schmidt | B01J 8/1836 422/146 |
| 2009/0038222 | A1 * | 2/2009 | Douglas | C10J 3/487 48/73 |
| 2011/0144790 | A1 * | 6/2011 | Gerritsen | G01K 1/026 700/108 |
| 2013/0078154 | A1 * | 3/2013 | Sullivan | G01B 21/085 422/119 |
| 2013/0269252 | A1 * | 10/2013 | Tsangaris | C10J 3/20 48/209 |
| 2014/0061539 | A1 * | 3/2014 | Balasubramaniyan | C10J 3/506 252/373 |
| 2015/0084246 | A1 * | 3/2015 | Tang | F27D 9/00 266/46 |

FOREIGN PATENT DOCUMENTS

| | | |
|---|---|---|
| JP | S52-17272 B1 | 5/1977 |
| JP | S52-139363 U | 10/1977 |
| JP | S53113205 U | 9/1978 |
| JP | S5465906 U | 5/1979 |
| JP | 10160586 A * | 6/1998 |
| JP | 2004239635 A | 8/2004 |
| JP | 2004301615 A | 10/2004 |
| JP | 2006509995 A | 3/2006 |
| JP | 2010535895 A | 11/2010 |
| JP | 2012062376 A | 3/2012 |
| RU | 2237730 C2 * | 4/2002 |
| SU | 336280 A * | 1/1972 |
| WO | 0019177 A1 | 4/2000 |
| WO | 03081192 A1 | 10/2003 |
| WO | 2009-020809 A1 | 2/2009 |

OTHER PUBLICATIONS

International Search Report and Written Opinion mailed Feb. 10, 2014 in corresponding International application No. PCT/US2013/069465 (10 pages).

Notification of Reasons for Rejection issued Jun. 7, 2016 in corresponding Japanese application No. 2015-5450070 (4 pages).

Office Action issued in Chinese Application No. 201310613713.0; Dated Dec. 14, 2015 (5 pages).

Extended European Search Report issued Jun. 3, 2016, in corresponding European Application No. 13857821.6 (6 pages).

Office Action issued May 25, 2016, in corresponding Canadian Application No. 2,893,331 (4 pages).

Notice of Final Rejection (Office Action) dated Mar. 30, 2017, issued by the Korean Intellectual Property Office in corresponding Korean Patent Application No. KR 10-2015-7017035, with English translation (7 pages).

* cited by examiner

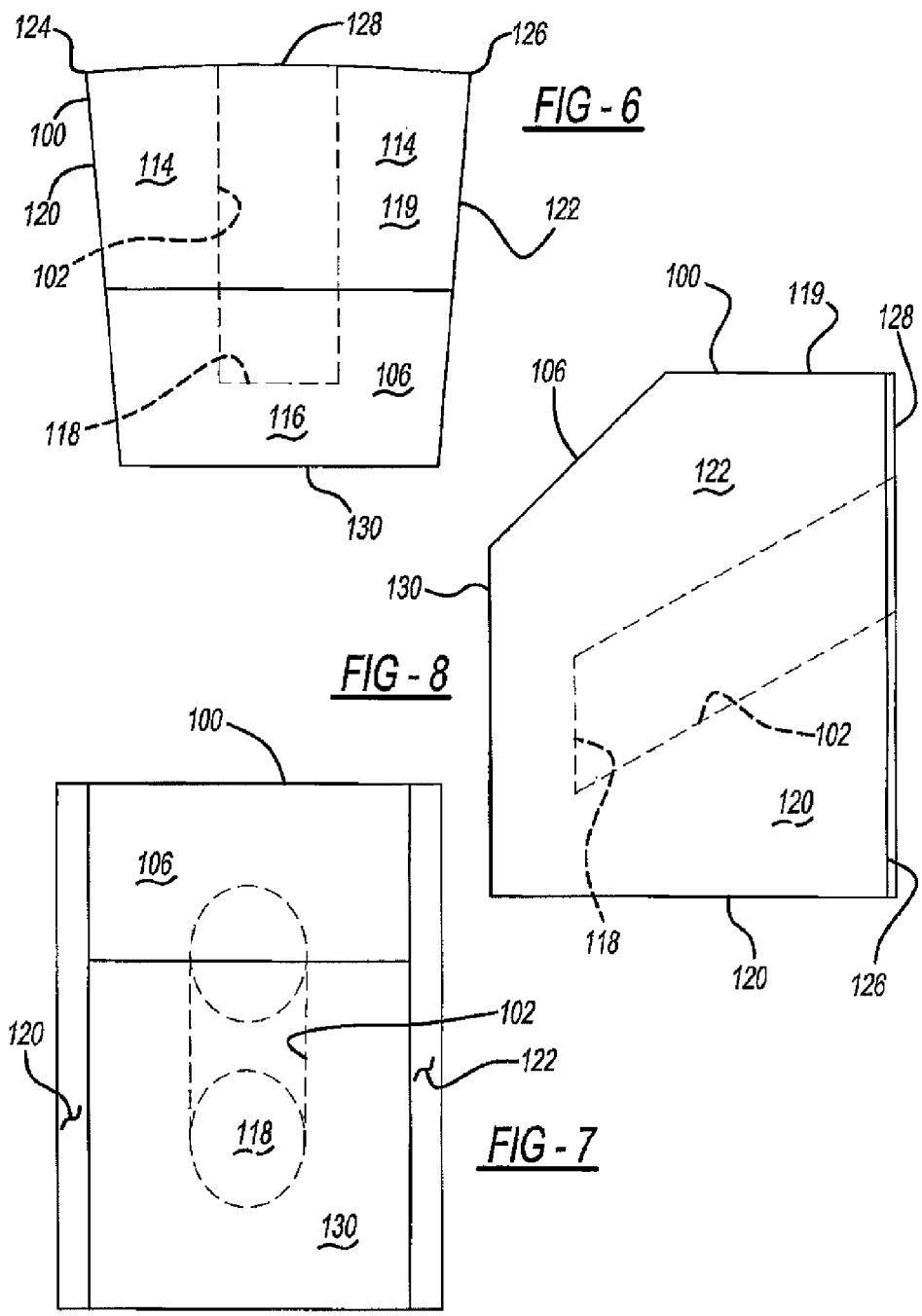

THERMAL SENSING SYSTEM

CROSS-REFERENCE TO RELATED APPLICATIONS

This application, pursuant to 35 U.S.C. §119(e), claims priority to U.S. Provisional Application Ser. No. 61/731,927, filed Nov. 30, 2012. That application is incorporated by reference in its entirety.

FIELD OF THE DISCLOSURE

This disclosure relates to physical protection of a thermal sensor subjected to high temperatures and corrosive environments.

BACKGROUND OF INVENTION

In a slagging gasifier within a syngas production facility, a thermal sensor may be used to measure temperatures in a first stage location within the slagging gasifier to control temperature adjustments. By controlling temperature within the slagging gasifier, solid feed syngas conversion may be optimized which may reduce refractory wear rates and maintenance costs associated with the slagging gasifier. While current thermal sensors have proven useful for temperature measurement within a slagging gasifier, their use is not with limitations. What is needed then is a device that accurately measures temperatures, does not accumulate slag, resists physical contact with its surroundings, and that has an extended useful life over current temperature measuring devices.

BRIEF SUMMARY OF THE DISCLOSURE

The teachings of the disclosure may include a temperature measurement system for a dual stage slagging gasifier. In a first stage gasifier area, a first stage gasifier volume may be defined by a first stage gasifier refractory wall. A second stage gasifier may have a second stage gasifier refractory wall that defines a second stage gasifier volume. A protruding refractory brick may protrude beyond a normal interior wall surface of the first stage refractory wall and protrude toward and into the first stage gasifier volume. A temperature sensor having a temperature sensing tip may reside within the protruding refractory brick, but not completely through the protruding refractory brick.

A plurality of brick layers may together form the first stage refractory wall that provides a surrounding boundary of the first stage gasifier volume. The temperature sensor may reside completely through the plurality of brick layers, and into the protruding refractory brick, but not completely through the protruding refractory brick. The protruding refractory brick may have a blind hole in it within which the temperature sensing tip of the temperature sensor resides. Moreover, the temperature sensing tip may reside in a portion of the protruding refractory brick that protrudes into the general flow path of the fluid stream through the first stage gasifier volume.

The protruding refractory brick may have numerous faces; some directly exposed to the general flow path of the fluid stream and some not exposed to the general flow path of the fluid stream. A protruding refractory brick first face may form an angle of approximately 45 degrees relative to a general flow path of the fluid stream through the first stage gasifier volume and the first face be exposed to the fluid stream. Protruding refractory brick first face may form any angle that is not 90 degrees relative to a general flow path of the fluid stream through the first stage gasifier volume or an angle that is 90 degrees. Protruding refractory brick first face forms an angle of approximately 45 degrees relative to a general flow path of the fluid stream through the first stage gasifier volume. A protruding refractory brick second face may contact an adjacent refractory brick. A protruding refractory brick third face may simply be parallel to a general flow path of the fluid stream through the first stage gasifier volume.

BRIEF DESCRIPTION OF DRAWINGS

A more complete understanding of the present invention and benefits thereof may be acquired by referring to the follow description taken in conjunction with the accompanying drawings in which:

FIG. 6 is a side view of a refractory brick of a gasifier wall in accordance with the teachings of the present disclosure;

FIG. 7 is a side view of a refractory brick of a gasifier wall in accordance with the teachings of the present disclosure; and FIG. 8 is a side view of a refractory brick of a gasifier wall in accordance with the teachings of the present disclosure.

DETAILED DESCRIPTION

Figure 1:
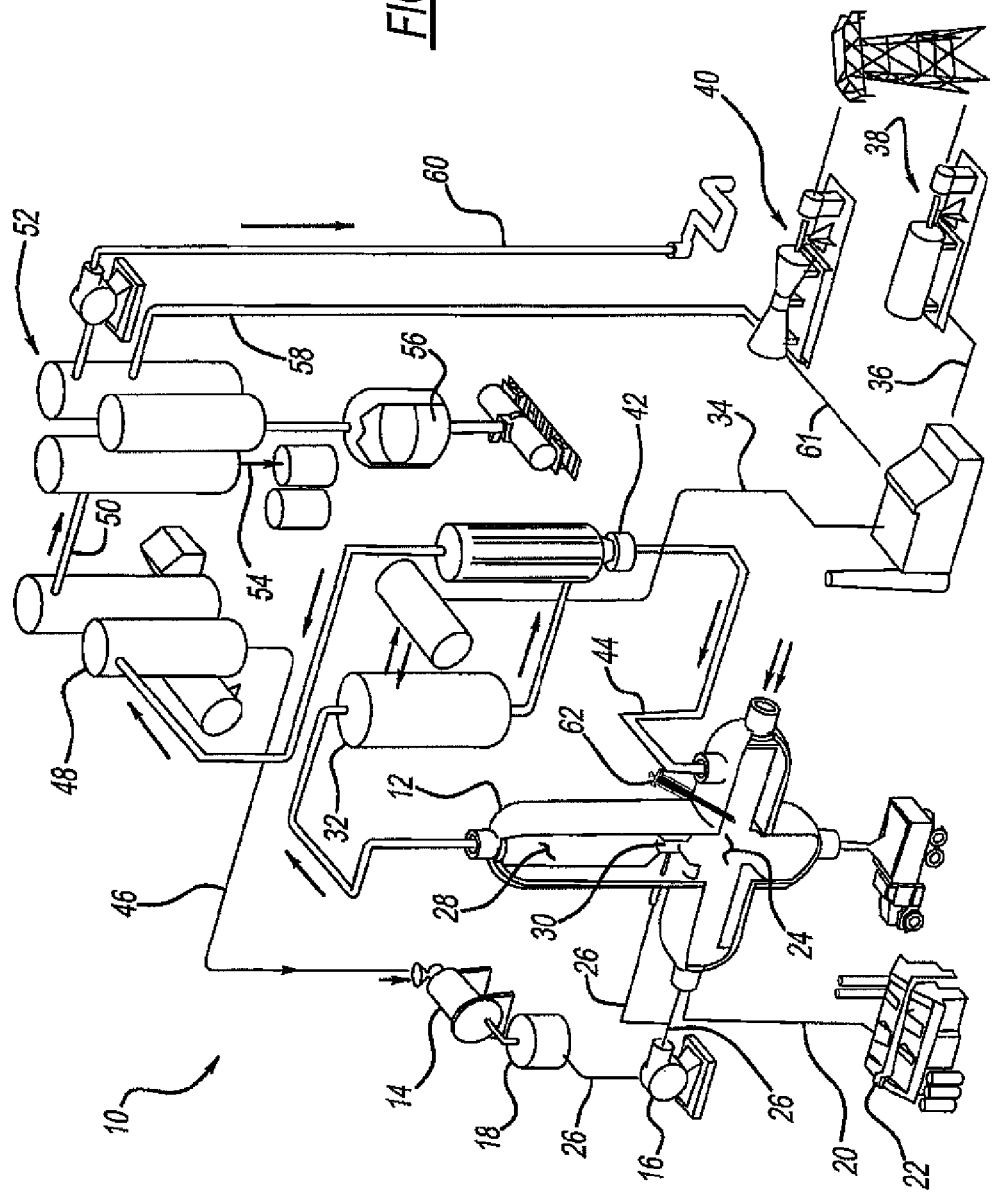
FIG. 1 is a diagram of a syngas production facility within which the teachings of the present disclosure may be employed.

Turning now to FIGS. 1-8, and beginning with FIG. 1, inventive features and concepts will be presented; however, the invention is not limited to embodiments described or depicted in FIGS. 1-8. FIG. 1 depicts a syngas production facility 10 with a two-stage gasifier 12. In feed preparation for two-stage gasifier 12, low-cost feedstocks, such as bituminous and sub-bituminous coal, or petroleum coke, are crushed and mixed with water in a crusher-mixer 14 to form a pumpable slurry. The slurry is pumped via a pump 16 from a slurry tank 18 and into two-stage gasifier 12 along with oxygen 20 from an oxygen plant 22. Gasification occurs in two-stage gasifier 12 where slurry 26 and oxygen 20 react readily with oxygen in the first stage gasifier area 24 within two-stage gasifier 12 to form hydrogen, carbon monoxide, carbon dioxide and methane. During gasification, first stage gasifier area 24 within two-stage gasifier 12 is elevated to a high temperature (e.g. 2,600-2,700 degrees F.) to ensure complete conversion of all feedstock material. Synthesis gas from the horizontal, first stage gasifier area 24 eventually enters a vertical, second stage gasifier area 28. Before entering second stage gasifier area 28, additional slurry 26 is added to the gas passing between first stage gasifier area 24 and second stage gasifier area 28, such as at throat passage 30 of two-stage gasifier 12. Processes performed within second stage gasifier area 28 increase efficiency and reduce oxygen consumption. Inorganic materials from the coal are trapped in a glassy matrix resembling coarse sand. This sand-like material is referred to as slag, is inert and has a variety of uses, such as in the construction industry. Typically, no ash waste results from the gasification process.

Syngas production facility 10 utilizes a unique firetube syngas cooler to recover heat and produce high-pressure steam in steam generator 32. Steam produced in steam generator 32 is routed in steam pipes 34, 36 to a steam turbine and electrical generator 38 to generate electrical power in addition to the electrical power from a gas turbine and electrical generator 40. Syngas production facility 10 may incorporate candle filter elements 42 to remove all particulates from the syngas flowing into candle filter elements 42. This simple, dry system is significantly more efficient than wet scrubbing systems and removes more particulates. Syngas flowing through candle filter elements 42 results in recycled char that may be directed into first stage gasifier area 24 of two-stage gasifier 12 via char pipe 44.

As sour synthesis gas is cooled, steam is injected into the gas stream. A catalytic reaction follows which enhances the hydrogen content of the syngas. The size of this "shift" equipment is minimized in the process as a result of conversion process reactions that previously occurred in the second stage gasifier area 28 of the two-stage gasifier 12. Sour water may flow from tank 48 through sour water feed pipe 46 and into crusher-mixer 14. In a series of chemical process steps, chlorides, mercury and sulfur contaminants are removed from the syngas stream 50 after flowing from tank 48 and into vessels of contaminant removal area 52. Mercury 54 is captured in a carbon bed for disposal in approved sites while sulfur 56 in the synthesis gas is recovered and converted to elemental sulfur, which may be sold in agricultural and other markets. The process of syngas production facility 10 recycles unconverted tailgas to provide excellent success regarding sulfur recovery. Carbon dioxide ($CO_2$) capture is economically achieved at a fraction of the cost compared to conventional boiler combustion technology because carbon dioxide in a $CO_2$ stream 60 is separated from the synthesis gas, dried and compressed for use in consumer products, or injected underground for enhanced oil recovery, as example uses. Clean, hydrogen rich synthesis gas in a hydrogen stream 58 may be utilized in a gas turbine and electrical generator 40 to generate electric power, and heat recovered from the clean exhaust 61 stream of the gas turbine and electrical generator 40 may be used to generate additional steam for steam turbine and electrical generator 38. To improve enhanced first stage gasifier temperature measurement and control, which ensures optimized solid feed syngas conversion and reduce gasifier refractory wear rates and maintenance costs, a sensing device 62 may be situated through a wall of two-stage gasifier 12.

Figure 2:
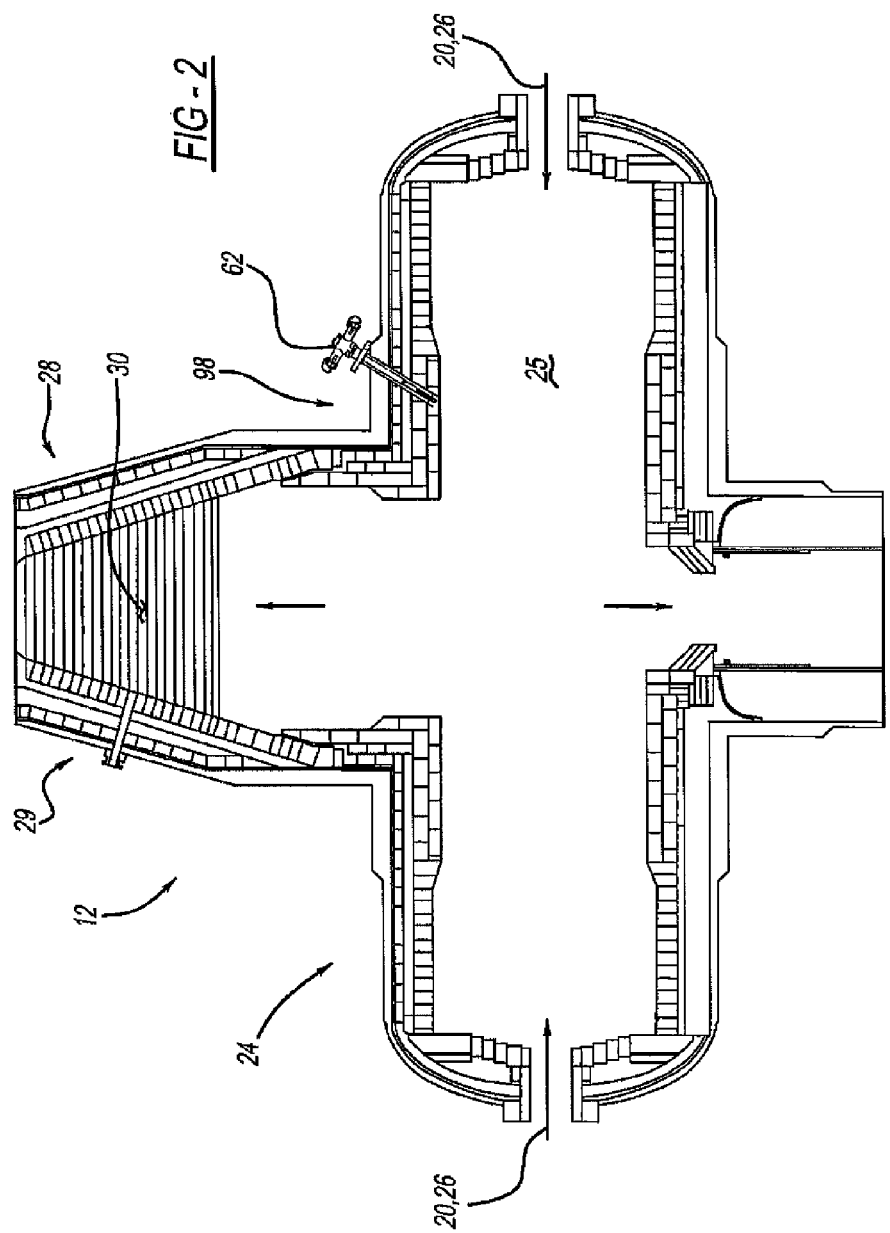
FIG. 2 is an enlarged view of a gasifier indicating the location of a thermal sensor structure in accordance with the teachings of the present disclosure.
Figure 4:
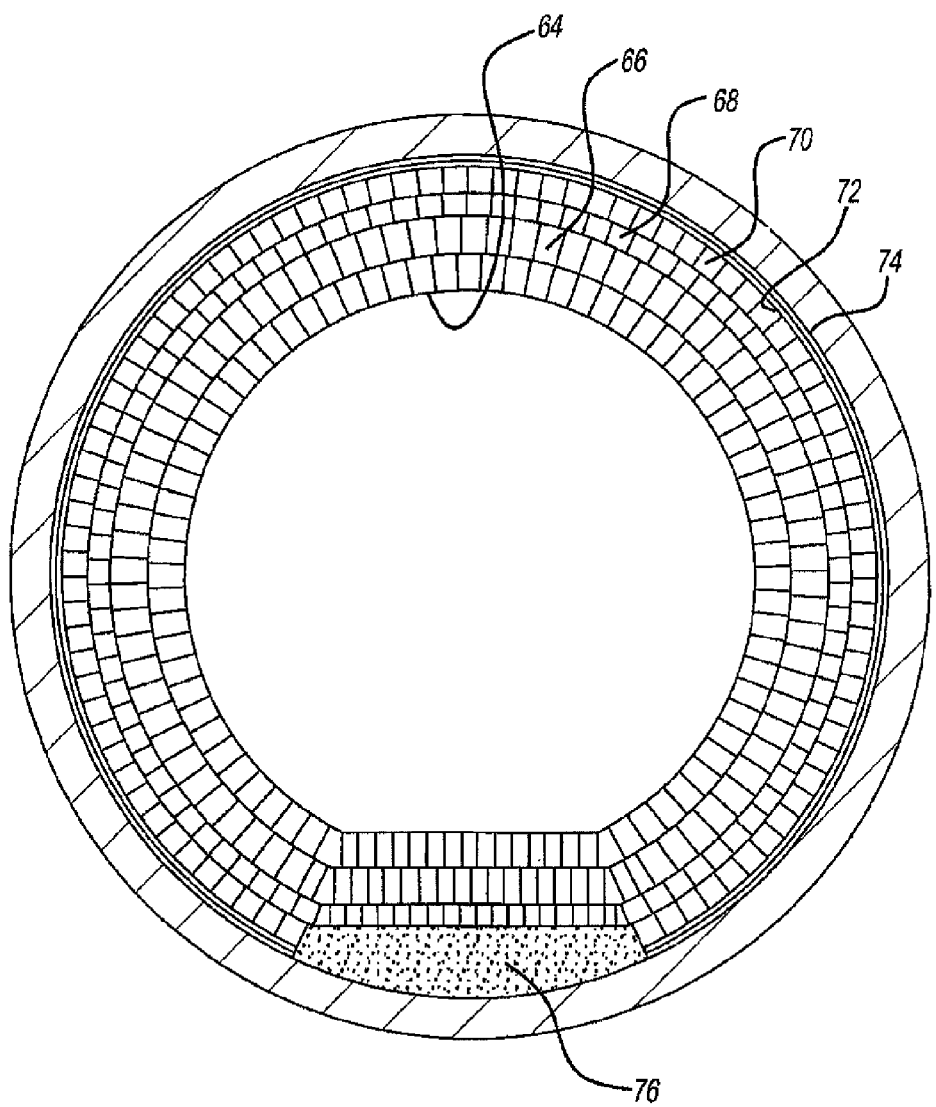
FIG. 4 is a cross-sectional view of a gasifier wall depicting a location of a thermal measuring device in accordance with the teachings of the present disclosure.

Turning now to FIG. 2, an enlarged view of two-stage gasifier 12 is depicted with sheathed or protected thermal sensing device 62 located completely through layers of refractory brick that define first stage gasifier area 24. FIG. 4 depicts an enlarged view of layers of refractory brick that define first stage gasifier area 24. Continuing with FIG. 4, layers of refractory brick may include, from an inside diameter or wall to an outside diameter or wall of first stage gasifier area 24 of two-stage gasifier 12: a first hot face brick layer 64, a second hot face brick layer 66, a safety liner brick layer 68, an insulating firebrick layer 70 (also known as an I.F.B. layer), a ceramic fiber paper layer 72, and a hexagon grating layer 74. A castable grating layer 76 may also form a section of an exterior or outside wall that defines first stage gasifier area 24. Although not depicted in FIG. 4, but depicted in FIG. 2, sensing device 62 may pass through all layers defining first stage gasifier area 24.

Figure 3:
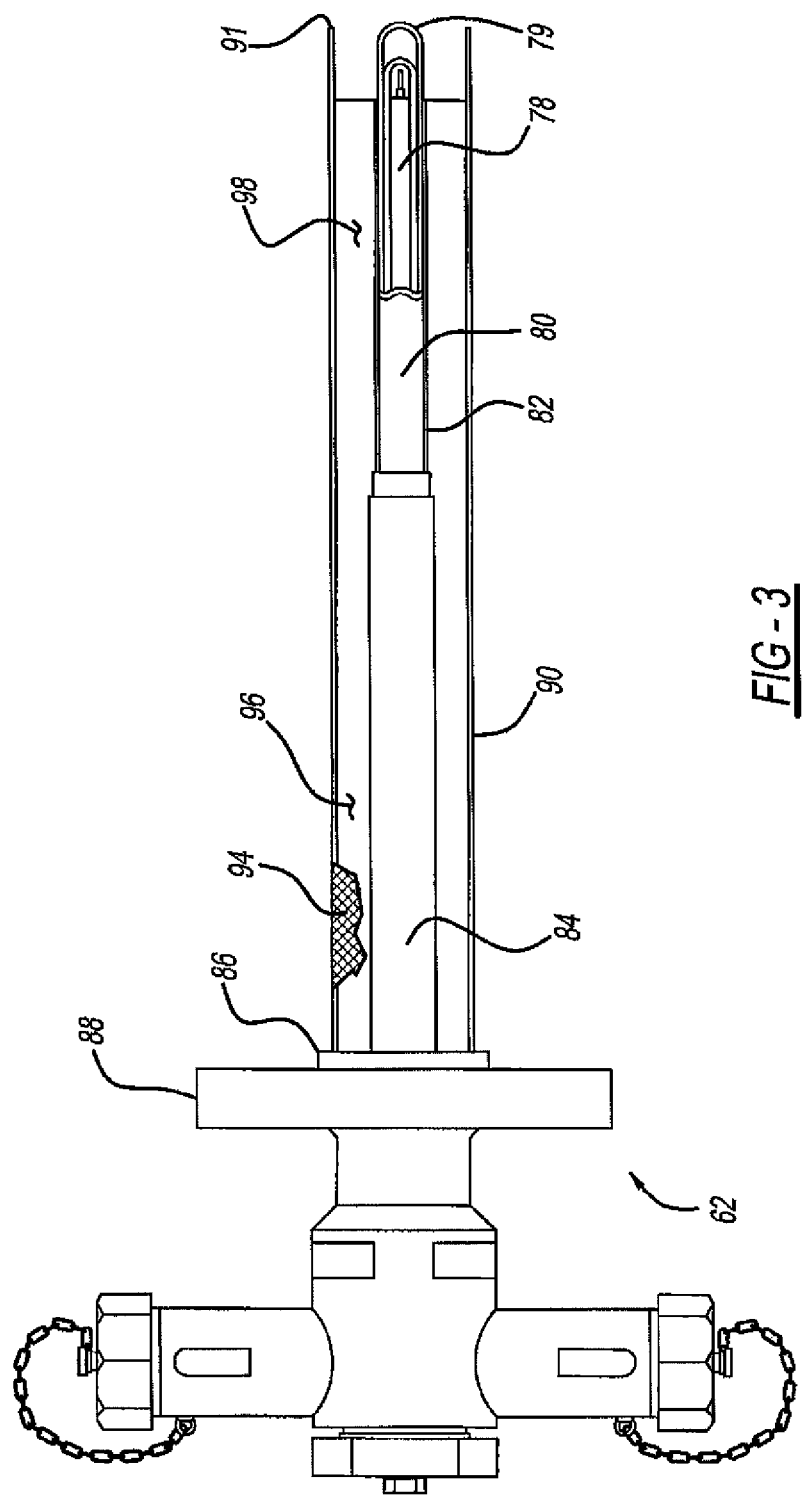
FIG. 3 is a side view of a thermal measuring device in accordance with the teachings of the present disclosure.

Turning to FIG. 3, sensing device 62 may utilize a temperature measuring device such as a sapphire thermal sensor 78, which may be encased or surrounded by an alumina tube 80. A thermocouple may reside within sapphire thermal sensor 78, which may protect the thermocouple. Sapphire thermal sensor 78 resists hydrogen permeation and since hydrogen gas from within first stage gasifier volume 25 may seep through refractory brick surrounding sapphire thermal sensor 78, wires of thermocouple are sufficiently protected from any hydrogen gas and slag corrosion. As used herein, the term "thermocouple" is a temperature sensing device that may include the thermocouple sensor and wires and any support, insulation, protection, or mounting means used incident with the thermocouple sensors and wires. Alumina tube 80 may then be contact-wrapped in ceramic fiber paper 82. A steel tube 84 may be placed over sapphire thermal sensor 78 and ceramic fiber paper 82 for at least a portion of the overall length of sensing device 62. Steel tube 84 may mount to a first flange 86, which may be mounted to a second flange 88. Abutting and mounted to first flange 86 is a metal sleeve 90, which may be cylindrical in shape and completely surround sapphire thermal sensor 78, except at a protective tip end 91 of metal sleeve 90. Protective tip end 91 may be open and unobstructed to permit air to flow freely to sapphire thermal sensor tip 79 to permit accurate temperature readings using sensing device 62. In a volume of space 96 surrounding steel tube 84, which more specifically may be between steel tube 84 and metal sleeve 90, ceramic fiber paper 94 may be installed, such as by stuffing with a tool and/or by hand packing. Such stuffing with a tool and/or by hand packing ceramic fiber paper 94 may be completed before mounting (e.g. welding) metal sleeve 90 to second flange 88. After mounting of metal sleeve 90 to first flange 86 and second flange 88 is complete, a thermal management material may be installed around alumina tube 80 such as between alumina tube 80 and metal sleeve 90 in volume of space 98. Thermal management material may be SAFFIL brand fibre, which may resist heat or act as a thermal barrier and provide structural support to prevent movement of alumina tube and sapphire thermal sensor 78 within metal sleeve 90. Thermal management material may act as a centering device for sapphire thermal sensor 78 within metal sleeve 90. Metal sleeve 90 is a protective sheath for sapphire thermal sensor 78. Other examples of thermal sensors applicable to the present disclosure may include ultrasonic thermal sensors, thermo-couples, optical thermometry, and acoustic or sound thermometry.

The temperature response, that is, the time for a change in gasifier temperature to be reflected in a thermocouple response depends in part on the thickness of the brick layer between the thermocouple and the gasification zone or volume of the first stage gasifier volume 25. In addition, the minor insulating effect of the hot face brick will result in the thermocouple mounted behind the hot face brick to potentially read lower than the actual gas temperature. The time delay and temperature differential are more pronounced with thicker layers of hot face brick between the temperature or thermocouple sensor and the first stage gasifier volume 25. The thickness of the layer of hot face brick between the thermocouple sensor and first stage gasifier volume 25 therefore should be less than about 12 inches (31 cm), preferably less than 9 inches (23 cm), more preferably less than about 6 inches (15 cm), and most preferably less than about 4.5 inches (12 cm). At the same time, the hot face brick is subjected to molten slag and the atmosphere of first stage gasifier volume, and the hot face brick may wear. Wear may be accelerated by stresses caused by the reduced thickness of the hot face brick in front of the thermocouple. Therefore, the thickness of the hot face brick is preferably greater than about 2 inches (5 cm), more preferably greater than about 3.5 inches (8.9 cm). For hydrocarbonaceous feedstock that produces higher quantities of molten slag, i.e., greater than about 0.1 percent by weight slag, the thickness of the hot face brick is preferably greater than about 3.5 inch (8.9 cm), more preferably greater than about 4 inches (10 cm). By using sapphire thermal sensor 78, which may be encased or surrounded by an alumina tube 80, temperature response times may be lessened or eliminated.

Figure 5:
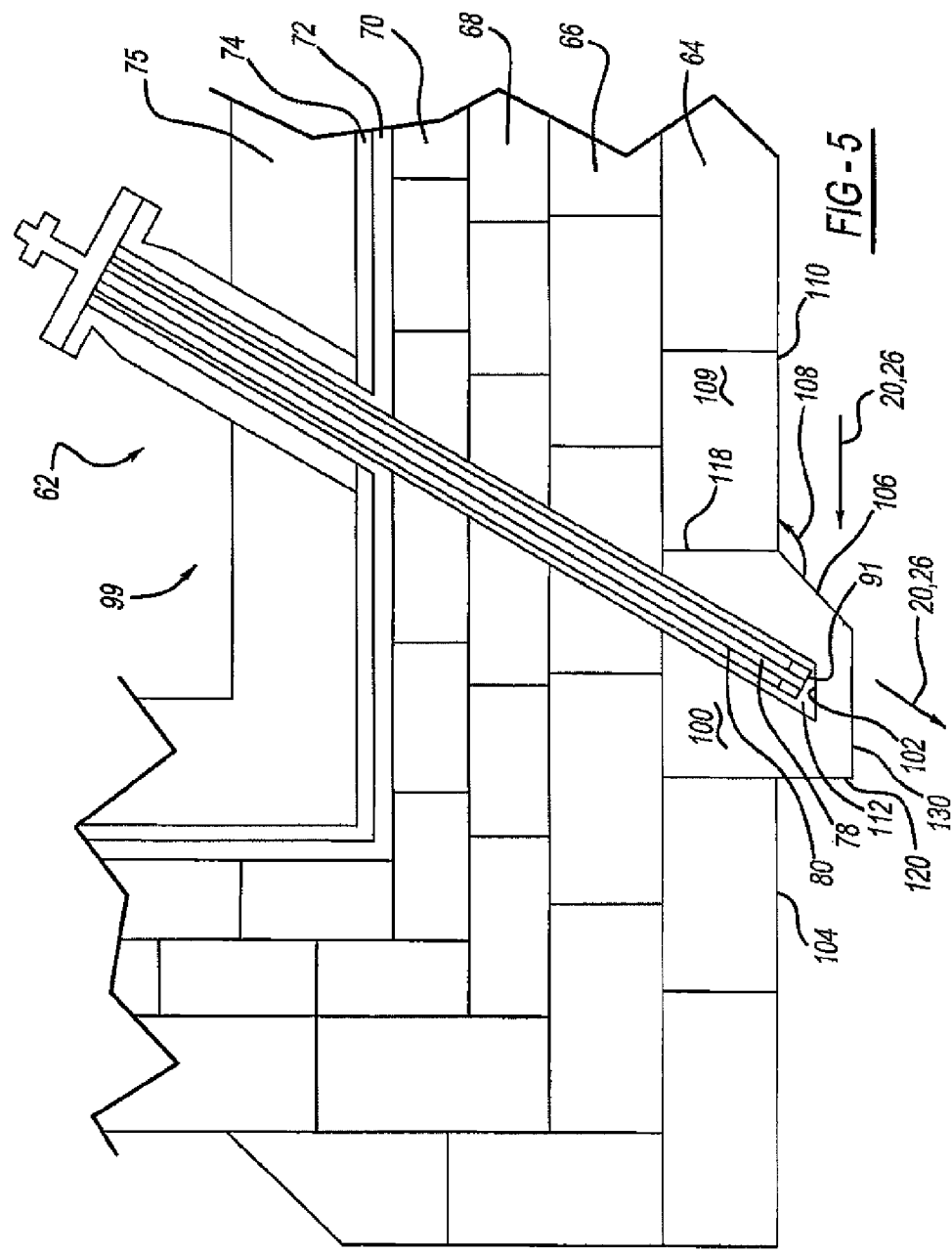
FIG. 5 is an enlarged side view of a gasifier wall depicting a thermal measuring device located within the gasifier wall in accordance with the teachings of the present disclosure.

Turning to FIG. 5, an enlarged view of a refractory brick wall section 99 through which sensing device 62 passes is depicted. Refractory brick wall section 99 may be characteristic of that explained in conjunction with FIG. 4, Sensing device 62 passes through first hot face brick layer 64, second hot face brick layer 66, safety liner brick layer 68, insulating fire brick layer 70, ceramic fiber paper layer 72, hexagon grating 74, and exterior brick layer 75, which may be an outermost layer of two-stage gasifier 12. Protective tip end 91 of sensing device 62 may or may not protrude past an interior surface 104 that defines a boundary of first stage gasifier area 24. Regardless of whether protective tip end 91 of sensing device 62 protrudes past an interior surface 104 that defines a boundary of first stage gasifier area 24, protective tip end 91 resides within a protruding refractory brick 100. Protective tip end 91 may reside completely within protruding refractory brick 100 such that any further penetration or insertion of sensing device 62 into hole 102, which may be bored or cast, within protruding refractory brick 100 would cause protective tip end 91 to strike an interior surface that defines an end wall adjacent a longitudinal end of metal sleeve 90, as if tip end were to continue to extend and make metal sleeve 90 longer. Stated slightly differently, when protective tip end 91 of sensing device 62 is inserted into hole 102, sapphire thermal sensor 78 and its surrounding alumina tube 80, are completely surrounded by walls of hole 102. Hole 102 may be cylindrical. Hole 102 may also be known as a blind hole because it is not a through hole or through-and-through hole.

Protruding refractory brick 100 may be considered or referred to as "protruding" because it protrudes or encroaches beyond the generally consistent surface or face 110 of first hot face brick layer 64, as depicted in FIG. 5, that faces toward the inside or volume known as first stage gasifier area 24 of two-stage gasifier 12. Advantages of protruding refractory brick 100 and its housing of protective tip end 91 of sensing device 62 are herein presented.

With continued reference to FIG. 5, protruding refractory brick 100, which may be a refractory brick with hole 102 (e.g. a blind hole) for sensing device 62, may be resident as a refractory brick that forms part of the boundary of interior first stage gasifier area 24. Protruding refractory brick 100, as depicted in FIG. 5, may also be known as a protruding refractory brick, and protrude into interior first stage gasifier area 24 and into a combined or mixed stream of oxygen 20 and slurry 26. Combined or mixed stream of oxygen 20 and slurry 26 may contact a face 106 of protruding refractory brick 100. Face 106 of protruding refractory brick 100 may be flat and may form an obtuse angle with an abutting or adjacent face 110 of an inside surface forming a boundary of first stage gasifier area 24. Face 106 of protruding refractory brick 100 may form an angle with an abutting or adjacent face 110 of an inside surface forming a boundary of first stage gasifier area 24 that is greater than 90 degrees. Upon combined or mixed stream of oxygen 20 and slurry 26 striking flat face 106, such combined or mixed stream 20, 26 is directed along flat face 106 and then away from protruding refractory brick 100 and toward a central or center area of first stage gasifier area 24. With combined or mixed stream 20, 26 striking protruding refractory brick 100 refractory brick is certain to warm to temperatures consistent or equal to that of combined or mixed stream 20, 26. Because combined or mixed stream 20, 26 warms protruding refractory brick 100, air space 112 within which protective tip end 91 resides, also warms to the temperature of combined or mixed stream 20, 26. When protective tip end 91 within which sapphire thermal sensor 78 resides is warmed, sapphire thermal sensor 78 accurately senses the temperature of air space 112 and thus, a temperature of combined or mixed stream 20, 26 which warms air space 112.

FIGS. 6-8 are side views of protruding refractory brick 100 depicting further details of protruding refractory brick 100. FIG. 6 depicts hole 102 that is not a through hole, but rather bottoms out and has brick material 114 surrounding the cylindrical portion of hole 102. Hole 102 may be a blind hole, which is not a through hole. Brick material also forms an end wall 116 which defines bottomed-out portion or end wall 118 that defines hole 102. FIG. 6 also depicts flat face 106 which is also formed in protruding refractory brick 100 such that it forms an obtuse angle 108 (FIG. 5) with brick face 110 of an adjacent or abutting refractory brick when installed in first stage gasifier area 24. FIG. 7 depicts brick face 120 and brick face 122 which correspond to flat faces that are on opposite sides of protruding refractory brick 100. Flat faces 120, 122 are non-parallel and oriented such that their faces would intersect if extended in an infinite plane. Moreover, an edge of face 120 and an edge of face 122 forms boundary ends of a curved or convex face 128 that is a face into which hole 102 is made. On a side of protruding refractory brick 100 that is opposite curved face 128, a flat face 130 resides and has no bored hole through it because hole 102 is a blind hole.

Stating teachings of the present disclosure slightly differently, a temperature measurement system for a two-stage gasifier 12 may employ a refractory wall, which may be layers of refractory bricks to form a refractory brick wall section 99, and a sensing device 62 (e.g. thermal sensor) with an end 91 having a temperature sensing tip 79 that resides completely or partially within refractory brick wall section 99. A temperature measurement system may employ a protruding refractory brick 100 as part of refractory brick wall section 99, wherein protruding refractory brick 100 surrounds end 91 of temperature sensing tip 79. Protruding refractory brick 100 resides in a fluid stream of first stage gasifier area 24. Protruding refractory brick 100 may have multiple faces and protruding refractory brick first face 106 may face into or toward mixed fluid stream 20, 26 within first stage gasifier area 24. Protruding refractory brick first face 106 may generally face upstream relative to the flow direction of mixed fluid stream 20, 26. In another example, protruding refractory brick first face 106, which may be flat, generally is situated at an angle that is not 90 degrees relative to a general flow path of fluid stream 20, 26. Protruding refractory brick 100 may have a second face 119, which may be flat, that contacts a second refractory brick 109, which forms a boundary of a first stage gasifier area 24 and comes in contact with gaseous flow path of fluid stream 20, 26 within first stage gasifier area 24. Protruding refractory brick 100 may have a third face 130 that is generally parallel to the mixed fluid stream 20, 26 through first stage gasifier area 24. Protruding refractory brick first face 106 may share an edge due to intersection with protruding refractory brick third face 130. Protruding refractory brick first face 106 may have an edge that contacts an edge with adjacent, second refractory brick 109. Protruding refractory brick first face 106 has a first edge that contacts the second refractory brick 109, and the protruding refractory brick first face 106 shares a second edge with the protruding refractory brick third face 130.

In another example, a temperature measurement system for a gasifier may employ first stage gasifier area 24 having first stage refractory brick wall 98 that defines first stage gasifier volume 25, second stage gasifier area 28 having second stage refractory wall 29 that defines a second stage gasifier volume. Protruding refractory brick 100 protrudes from interior surface 104 of first stage refractory brick wall 98 and toward first stage gasifier volume 25. Temperature sensing device 62 having temperature sensing tip 79 and protective tip end 91 may reside within protruding refractory brick 100. First stage gasifier area 24 may employ a plurality of brick layers 64, 66, 68, 70, 75 that together form first stage refractory wall 98. Temperature sensor 62 resides completely through the plurality of brick layers, except the protruding refractory brick 100. Protruding refractory brick 100 protrudes from the plurality of brick layers, and specifically interior surface 104 defining first stage gasifier volume 25, and into the first stage gasifier volume 25. Protruding refractory brick first face 106 may form an angle that is not 90 degrees relative to a general flow path of the mixed fluid stream 20, 26 through first stage gasifier volume 25. Protruding refractory brick first face 106 may form an angle of 45 degrees or approximately 45 degrees relative to a general flow path of the fluid stream through the first stage gasifier volume. Protruding refractory brick first face 106 may form an angle of approximately 45 degrees relative to a general flow path of mixed fluid stream 20, 26 through first stage gasifier volume 25. Protruding refractory brick first face 106 may face against a general flow path of the fluid stream through the first stage gasifier volume. End 91 of temperature sensing tip 79 resides in a portion of the protruding refractory brick 100 that protrudes into the general flow path of mixed fluid stream 20, 26 through first stage gasifier volume 25. Protruding refractory brick 100 defines a blind hole 102 within which the temperature sensing tip 79 of sapphire thermal sensor 78 resides. Temperature sensing tip 79 may reside in a portion of protruding refractory brick 100 that protrudes into a general flow path of mixed fluid stream 20,26 that flows through first stage gasifier volume 25.

There are many advantages to teachings of the present disclosure. One advantage is that temperature sensing tip 79 of sapphire thermal sensor 78, or whatever thermal sensor is used, is protected from direct contact with mixed fluid stream 20, 26 through first stage gasifier 24. Not only is temperature sensing tip 79 protected from mixed fluid stream 20, 26 and residual buildup of heated debris from mixed fluid stream 20, 26, because protruding refractory brick 100 provides a sheath or protective area and becomes the same temperature as mixed fluid stream 20, 26, accurate temperatures may be obtained for mixed fluid stream 20, 26 and the life of sapphire thermal sensor 78 may be extended since mixed fluid stream 20, 26 is not directed directly into temperature sensing tip 79. Moreover, metal sleeve 90 also protects the full length of sapphire thermal sensor 78, including temperature sending tip 79 of sapphire thermal sensor 78. Temperature sensing tip 79 is protected by protective tip end 91 of metal sleeve 90.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A temperature measurement system for a gasifier comprising:
   a refractory wall;
   a thermal sensor with a temperature sensing tip end that resides completely within the refractory wall; and
   a protruding refractory brick as part of the refractory wall, wherein the protruding refractory brick surrounds the temperature sensing tip in a blind hole where the protruding refractory brick forms an end wall;
   wherein the protruding refractory brick completely surrounds a tip end of the thermal sensor and resides in a fluid stream of the gasifier.

2. The temperature measurement system according to claim 1, further comprising:
   a protruding refractory brick first face that faces into the fluid stream of the gasifier.

3. The temperature measurement system according to claim 2, wherein the protruding refractory brick first face generally faces upstream relative to the fluid stream.

4. The temperature measurement system according to claim 3, wherein the protruding refractory brick first face generally faces an angle that is not 90 degrees relative to a general flow path of the fluid stream.

5. The temperature measurement system according to claim 4, wherein the protruding refractory brick further comprising:
   a protruding refractory brick second face that contacts a second refractory brick that forms a boundary of a first stage gasifier area.

6. The temperature measurement system according to claim 5, further comprising:
   a protruding refractory brick third face that contacts a third refractory brick that forms a boundary of a first stage gasifier area.

7. The temperature measurement system according to claim 6, further comprising:
   a protruding refractory brick fourth face that is generally parallel to the fluid stream of the gasifier.

8. The temperature measurement system according to claim 7, wherein the protruding refractory brick first face has a first edge that contacts the second refractory brick, and the protruding refractory brick first face shares a second edge with the protruding refractory brick fourth face.

9. A temperature measurement system for a gasifier comprising:

a first stage gasifier having a first stage refractory wall that defines a first stage gasifier volume;

a second stage gasifier having a second stage refractory wall that defines a second stage gasifier volume;

a protruding refractory brick that protrudes from the first stage refractory wall and toward the first stage gasifier volume; and a temperature sensor having a temperature sensing tip that resides within the protruding refractory brick in a blind hole where the protruding refractory brick forms an end wall.

10. The temperature measurement system according to claim 9, further comprising:

a plurality of brick layers that together form the first stage refractory wall, wherein the temperature sensor resides completely through the plurality of brick layers, except the protruding refractory brick.

11. The temperature measurement system according to claim 10, wherein the protruding refractory brick protrudes from the plurality of brick layers and into the first stage gasifier volume.

12. The temperature measurement system according to claim 11, the protruding refractory brick further comprising:

a protruding refractory brick first face that forms an angle that is not 90 degrees relative to a general flow path of the fluid stream through the first stage gasifier volume.

13. The temperature measurement system according to claim 11, wherein the protruding refractory brick first face forms an angle of approximately 45 degrees relative to a general flow path of the fluid stream through the first stage gasifier volume.

14. The temperature measurement system according to claim 13, wherein the protruding refractory brick first face forms an angle of approximately 45 degrees relative to a general flow path of the fluid stream through the first stage gasifier volume.

15. The temperature measurement system according to claim 14, wherein the temperature sensing tip resides in a portion of the protruding refractory brick that protrudes into the general flow path of the fluid stream through the first stage gasifier volume.

16. The temperature measurement system according to claim 15, wherein the protruding refractory brick defines a blind hole within which the temperature sensing tip of the temperature sensor resides.

17. A temperature measurement system for a gasifier comprising:

a first stage gasifier having a first stage refractory wall that defines a first stage gasifier volume;

a second stage gasifier having a second stage refractory wall that defines a second stage gasifier volume;

a temperature sensor having a temperature sensing tip;

a protruding refractory brick that protrudes from the first stage refractory wall and toward the first stage gasifier volume, the protruding refractory brick defining a blind hole within which the temperature sensing tip of the temperature sensor resides where the protruding refractory brick forms an end wall.

18. The temperature measurement system according to claim 17, further comprising:

a protective metal sleeve surrounding the temperature sensor, wherein the temperature sensing tip of the temperature sensor resides in a portion of the protruding refractory brick that protrudes into a general flow path of the fluid stream through the first stage gasifier volume.

* * * * *